(No Model.)
E. J. CUBLEY.
BANJO.
No. 253,849. Patented Feb. 21, 1882.
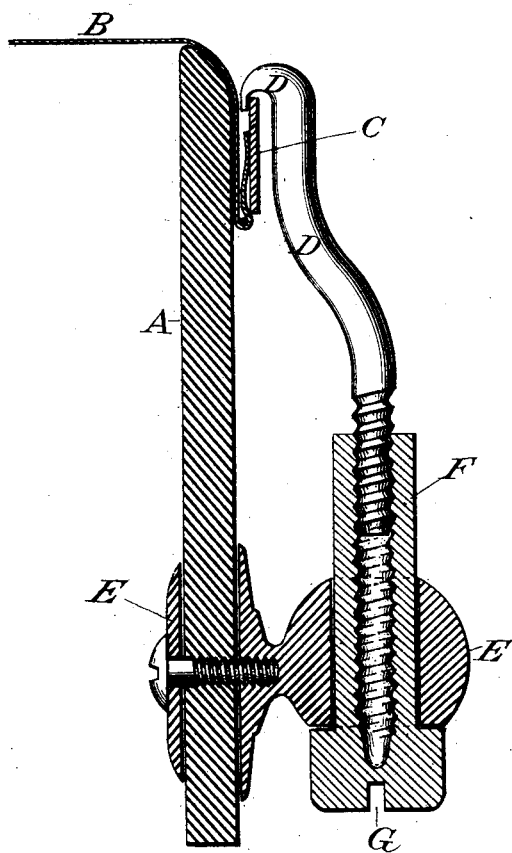
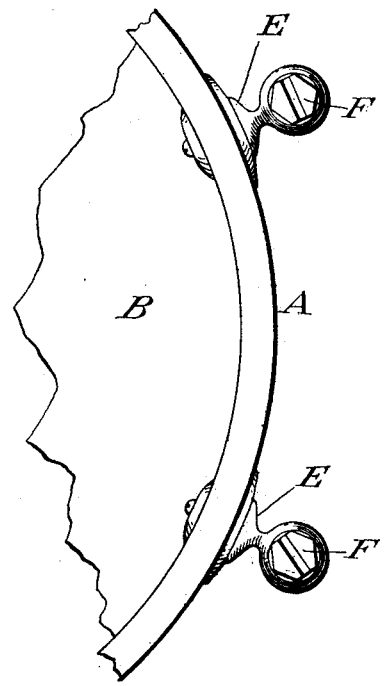
Witnesses:
George Van Zandt
Gust Nyquist
Inventor.
Edwin J. Cubley

UNITED STATES PATENT OFFICE.

EDWIN J. CUBLEY, OF RAVENSWOOD, ILLINOIS.

BANJO.

SPECIFICATION forming part of Letters Patent No. 253,849, dated February 21, 1882.

Application filed March 28, 1881. (No model.)

*To all whom it may concern:*

Be it known that I, EDWIN J. CUBLEY, a citizen of the United States, residing at Ravenswood, in the county of Cook and State of Illinois, have invented a new and useful Improvement in Banjos, which improvement is fully set forth in the following specification.

My invention relates to improvements in finial nuts used for tightening banjo-heads and tambourine-heads, and for such other purposes as it may be adapted; and the objects of my improvement are, first, to permit the use of a short straining-hook; second, to cover the end of said hook upon which the thread is cut and to cover and protect the thread from injury; third, to avoid any projection of said hook beyond the edge of the large hoop which forms the body of the banjo or tambourine; and, fourth, to secure a smooth and accurate bearing, both of the nut upon the hook and in the fixed stud through which both the straining-hook and nut pass. I attain these objects by the nut illustrated in the accompanying drawings, in which—

Figure 1 is a vertical section of the said nut, and a section of that part of a banjo to which the nut is applied, on an enlarged scale. Fig. 2 is a projection of a part of a banjo, and an end view of two of said nuts, actual size.

Similar letters refer to similar parts throughout the several views.

The large hoop A and the calf-skin head B constitute the body of a banjo. The small hoop C covers and retains the edge of the calf-skin head B, which is drawn tightly across the large hoop A. The hook D engages one edge of the small hoop C and holds it in place, and the long sleeved finial nut F, which passes through the stud E, engages the hook D by the screw-thread cut upon the outside of said hook and the inside of the sleeve of said nut. The small groove G is for the point of a screw-driver, used to turn said nut as may be desired, to draw or expel the hook D by the action of the screw-thread. The head of the nut F, being larger than the sleeve, forms a bearing against the fixed stud E. This head may be either round, square, or polygonal, and the screw-driver slot G may be omitted. I do not confine myself to either of these forms. The thread cut inside the nut should extend only a part of its length, or not entirely through.

The whole device is arranged to operate only upon the outside of the banjo or drum or other similar instrument upon which it may be placed.

I am aware that prior to my invention banjo-heads and tambourine-heads have been made with a hook passing through a fixed stud and secured by a nut screwed upon the projecting end of said hook. I therefore do not claim such a combination, broadly; but What I do claim as my invention, and desire to secure by Letters Patent, is—

The device for straining the membrane of a banjo, tambourine, drum, or other similar instrument, operating wholly upon the outside of the instrument, and consisting of the firmly-fixed stud E, the screw-hook D, and the long socketed or long sleeved nut F, which protects the screw-thread on the hook D, and has two bearings—that upon and along the shank of said hook and that upon and through the fixed stud—constructed and arranged substantially as described, and adapted for attachment to the banjo or other similar instrument, as set forth.

EDWIN J. CUBLEY.

Witnesses:
GUSTAF NYGUISE,
GEORGE WOODLAND.